United States Patent
Wong et al.

(10) Patent No.: US 11,457,471 B2
(45) Date of Patent: Sep. 27, 2022

(54) METHODS, COMMUNICATIONS DEVICE AND INFRASTRUCTURE EQUIPMENT

(71) Applicant: Sony Corporation, Tokyo (JP)

(72) Inventors: Shin Horng Wong, Basingstoke (GB); Martin Warwick Beale, Basingstoke (GB); Vivek Sharma, Basingstoke (GB); Yassin Aden Awad, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/265,216

(22) PCT Filed: Aug. 7, 2019

(86) PCT No.: PCT/EP2019/071252
§ 371 (c)(1),
(2) Date: Feb. 2, 2021

(87) PCT Pub. No.: WO2020/030709
PCT Pub. Date: Feb. 13, 2020

(65) Prior Publication Data
US 2021/0259013 A1    Aug. 19, 2021

(30) Foreign Application Priority Data
Aug. 9, 2018  (EP) .................................. 18188365

(51) Int. Cl.
*H04W 74/00* (2009.01)
*H04W 68/00* (2009.01)
*H04W 74/08* (2009.01)

(52) U.S. Cl.
CPC ....... *H04W 74/008* (2013.01); *H04W 68/005* (2013.01); *H04W 74/004* (2013.01); *H04W 74/0833* (2013.01)

(58) Field of Classification Search
None
See application file for complete search history.

(56) References Cited

U.S. PATENT DOCUMENTS

| 2018/0213556 A1* | 7/2018 | Rico Alvarino ...... H04W 68/02 |
| 2018/0234839 A1* | 8/2018 | Tenny .................. H04W 12/10 |

(Continued)

FOREIGN PATENT DOCUMENTS

| CN | 107241764 A | * | 10/2017 | .......... H04W 74/004 |
| CN | 107241764 A | * | 10/2017 | ............ H04W 28/06 |

(Continued)

OTHER PUBLICATIONS

International Search Report and Written Opinion dated Oct. 9, 2019, received for PCT Application PCT/EP2019/071252, Filed on Aug. 7, 2019, 10 pages.

(Continued)

*Primary Examiner* — Jamaal Henson
(74) *Attorney, Agent, or Firm* — Xsensus LLP

(57) ABSTRACT

A method of operating a communications device for receiving user plane data from a wireless communications network when the communications device is not in an active radio resource connected mode is provided. The method comprises receiving a message from the wireless communications network, the message including an indication that the wireless communications network has user plane data for transmission to the communications device while the communications device is not in an active mode, determining from the message a set of radio resources on which the user plane data is to be transmitted, wherein the user plane data is to be received by the communications device from the wireless communications network as part of a random access procedure, and transmitting to the wireless communications network an indication of whether or not the (Continued)

communications device successfully received the user plane data using the determined set of radio resources.

20 Claims, 7 Drawing Sheets

(56) References Cited

U.S. PATENT DOCUMENTS

| | | | | |
|---|---|---|---|---|
| 2018/0324854 A1* | 11/2018 | Phuyal | ............... | H04W 74/085 |
| 2019/0104553 A1* | 4/2019 | Johansson | ......... | H04W 74/0833 |
| 2019/0230626 A1* | 7/2019 | Rune | .................... | H04W 68/02 |
| 2020/0037367 A1* | 1/2020 | Kim | ................... | H04W 74/006 |
| 2020/0187245 A1* | 6/2020 | Fujishiro | ............. | H04W 74/002 |
| 2020/0229133 A1* | 7/2020 | Yi | ........................ | H04W 76/28 |
| 2021/0212020 A1* | 7/2021 | Liu | .................. | H04W 72/1289 |

FOREIGN PATENT DOCUMENTS

| | | | | |
|---|---|---|---|---|
| EP | 3211941 A1 * | 8/2017 | ......... | H04W 68/005 |
| EP | 3211941 A1 | 8/2017 | | |
| WO | WO-2015035591 A * | 3/2015 | ......... | H04L 12/1407 |
| WO | 2016/204985 A1 | 12/2016 | | |
| WO | 2018/029001 A1 | 2/2018 | | |
| WO | 2018/114258 A1 | 6/2018 | | |
| WO | 2018/136711 A2 | 7/2018 | | |
| WO | WO-2018124693 A1 * | 7/2018 | ........ | H04W 28/0247 |
| WO | 2019/204985 A1 | 10/2019 | | |

OTHER PUBLICATIONS

Sony, "DL Data Transmission in RRC_Inactive", 3GPP TSG-RAN WG2 NR Ad Hoc, R2-1700138, Jan. 17-19, 2017, 3 pages.
Ericsson, "Revised WID for Further Enhanced MTC for LTE", 3GPP TSG RAN Meeting #73, RP-161464, Sep. 19-22, 2016, 6 pages.
Huawei et al., "Revised Work Item Proposal: Enhancements of NB-IoT", 3GPP TSG RAN Meeting #73, RP-161901, Sep. 19-22, 2016, 8 pages.
Ericsson et al., "New WID on Even further enhanced MTC for LTE", 3GPP TSG RAN Meeting #75, RP-170732, Mar. 6-9, 2017, 4 pages.
Huawei et al., "New WID on Further NB-IoT Enhancements", 3GPP TSG RAN Meeting #75, RP-170852, Mar. 6-9, 2017, 6 pages.
Ericsson, "New WID on Rel-16 MTC Enhancements for LTE", 3GPP TSG RAN Meeting #80, RP-181450, Jun. 11-14, 2018, 4 pages.
Ericsson et al., "New WID on Rel-16 Enhancements for NB-IoT", 3GPP TSG RAN Meeting #80, RP-181451, Jun. 11-14, 2018, 4 pages.
Holma et al., "LTE for UMTS OFDMA and SC-FDMA Based Radio Access", John Wiley and Sons, 2009, pp. 25-27.
NTT Docomo, Inc., "Revised WID on New Radio Access Technology", 3GPP TSG RAN Meeting #78, RP-172834, Dec. 18-21, 2017, 11 pages.
3GPP, "Study on Scenarios and Requirements for Next Generation Access Technologies", Release 14, TR 38.913 V14.2.0, Mar. 2017, pp. 1-38.

* cited by examiner

METHODS, COMMUNICATIONS DEVICE AND INFRASTRUCTURE EQUIPMENT

CROSS-REFERENCE TO RELATED APPLICATIONS

The present application is based on PCT filing PCT/EP2019/071252, filed Aug. 7, 2019, which claims priority to EP 18188365.3, filed Aug. 9, 2018, the entire contents of each are incorporated herein by reference.

BACKGROUND

Field of Disclosure

The present disclosure relates to methods and various telecommunications apparatus for the communication of random access procedure messages.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. The IoT is further enhanced in 3GPP by the introduction of two additional Release 16 Work Items, namely A-MTC (Additional Machine Type Communications Enhancements) [5] and A-NB-IoT (Additional Enhancement for Narrowband Internet of Things) [6].

At least some devices making use of these technologies are expected to be low complexity and inexpensive devices requiring relatively infrequent communication of relatively low bandwidth data. It is further expected some of these types of device may be required to operate in areas of relatively poor coverage, for example, in a basement or other location with relatively high penetration loss (e.g. for smart meter type applications), or in remote locations (e.g. for remote monitoring applications), and this has given rise to proposals for enhancing coverage, for example using repeat transmissions.

The increasing use of different types of terminal devices associated with different traffic profiles and requirements for coverage enhancement gives rise to new challenges for efficiently handling communications in wireless telecommunications systems that need to be addressed.

SUMMARY OF THE DISCLOSURE

The present disclosure can help address or mitigate at least some of the issues discussed above.

Embodiments of the present technique can provide a method of operating a communications device for receiving user plane data from a wireless communications network when the communications device is not in an active radio resource connected mode. The method comprises receiving one of paging signalling and a random access procedure message from the wireless communications network, wherein the one of the paging signalling and the random access procedure message comprises an indication that the wireless communications network has user plane data for transmission to the communications device while the communications device is not in an active radio resource connected mode, determining from the one of the paging signalling and the random access procedure message a set of radio resources on which the user plane data is to be transmitted by the wireless communications network to the communications device, wherein the user plane data is to be received by the communications device from the wireless communications network as part of a random access procedure, and transmitting to the wireless communications network an indication of whether or not the communications device successfully received the user plane data using the determined set of radio resources.

Embodiments of the present technique, which further relate to communications devices, infrastructure equipment, methods of operating infrastructure equipment and circuitry for communications devices and infrastructure equipment, allow for the transmission of feedback from a communications device following the transmission of a downlink early data transmission by the network during a random access procedure.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
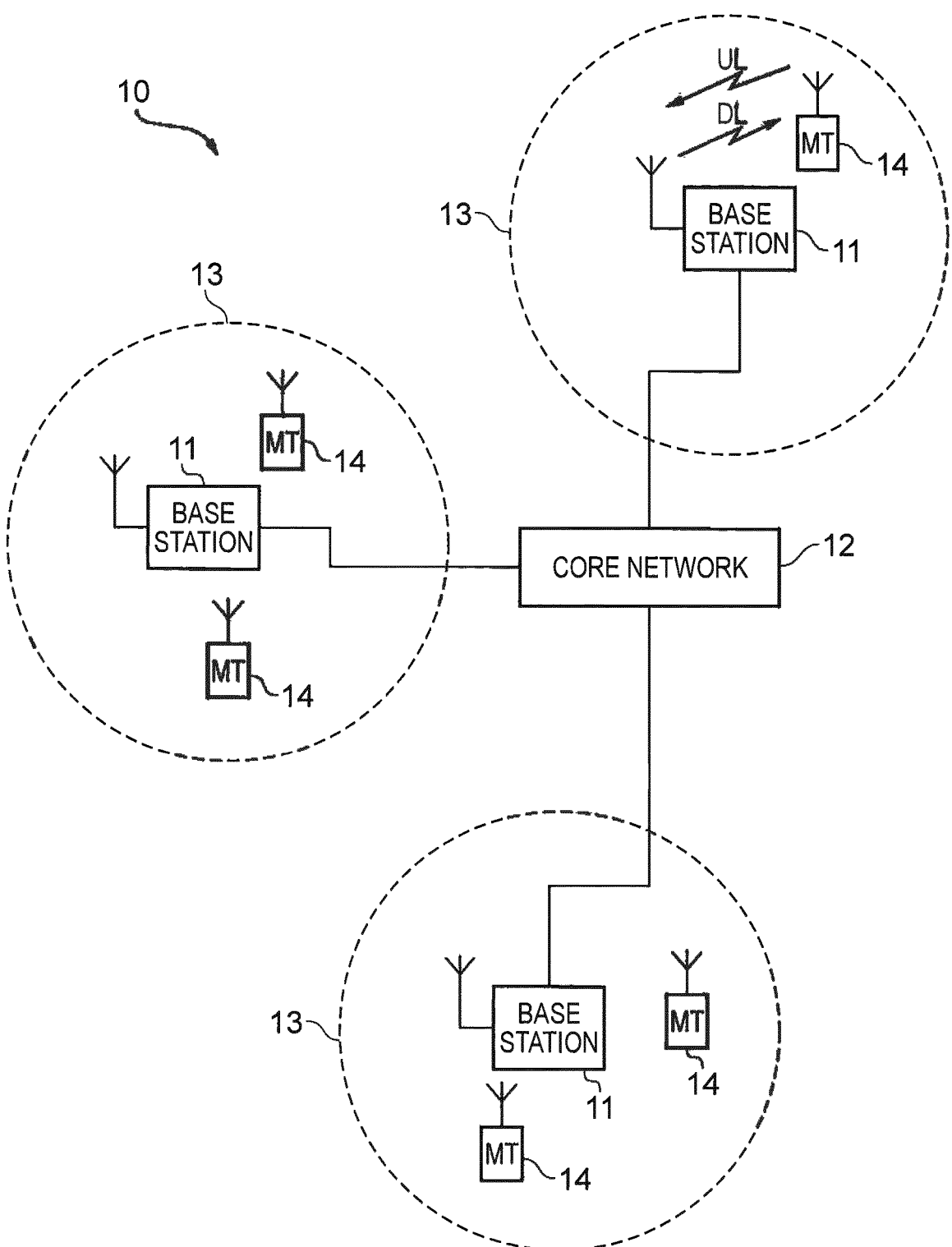
FIG. 1 schematically represents some aspects of an LTE-type wireless telecommunication system which may be configured to operate in accordance with certain embodiments of the present disclosure.

Long Term Evolution Advanced Radio Access Technology (4G) FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [7]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [3]

eMBB services are characterised by high capacity with a requirement to support up to 20 Gb/s. The requirement for URLLC is a reliability of $1-10^{-5}$ (99.999%) for one transmission of a relatively short packet such as 32 bytes with a user plane latency of 1 ms [4].

The elements of the wireless access network shown in FIG. 1 may be equally applied to a 5G new RAT configuration, except that a change in terminology may be applied as mentioned above.

Figure 2:
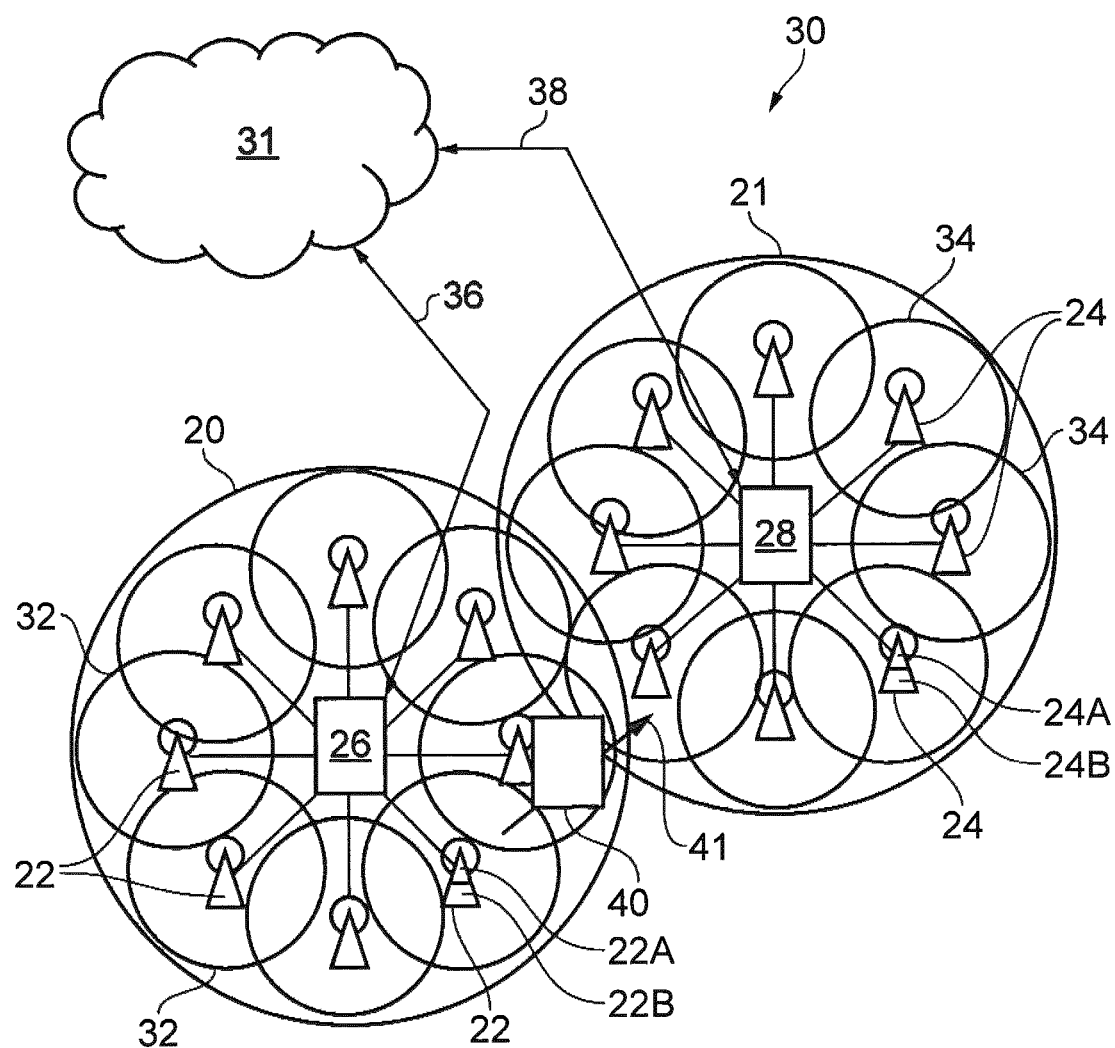
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 in a cell has a coverage area (radio access footprint) 32, 34, where the aggregation of the coverage areas of the distributed units 22, 24 defines the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Random Access (RACH) Procedure and Early Data Transmission (EDT)

In wireless telecommunications networks, such as LTE type networks, there are different Radio Resource Control (RRC) modes for terminal devices. For example, it is common to support an RRC idle mode (RRC_IDLE) and an RRC connected mode (RRC CONNECTED). A terminal device in the idle mode may move to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in RRC idle mode to exchange data with a network involves the terminal device first performing an RRC connection procedure (random access procedure) with the network. The RRC connection procedure involves the UE initially transmitting a random access preamble (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving. This conventional approach may for convenience be referred to herein as a legacy approach.

The random access procedure can be relatively inefficient if the amount of data to be communicated with the network is relatively small, for example in terms of signalling overhead and associated UE power usage. There have therefore been proposals for a UE to communicate higher-layer/user plane data with the network during the RRC connection procedure itself. One approach for this is referred to as Early Data Transmission (EDT) and allows the UE to transmit and/or receive data during the Random Access process whilst in idle mode, thereby communicating the relevant data without the need to complete the establishment of an RRC connection. This can be particularly helpful for infrequent and short messages type of traffic, since EDT would reduce the high overhead for RRC signaling in establishing an RRC connection and performing an RRC disconnection.

One of the many uses for IoT is to provide infrequent reports and receive infrequent commands from the network, e.g. sensors and utility meters, and the IoT device (i.e. UE) is expected to be in power saving mode or long DRX most of the time to conserve battery power. Hence, when there is data to transmit or receive, due to the long DRX, the UE would need to reacquire synchronisation, update system information and connect to the network to perform the data exchange, which can take a long time and therefore consume a lot of battery power. Recognising this, one of the objectives for Rel-15 IoT (efeMTC and feNB-IoT) is to reduce the latency for data transmission, which consists of reducing system acquisition time (i.e. synchronisation and updating System Information) and enabling EDT.

Figure 3:
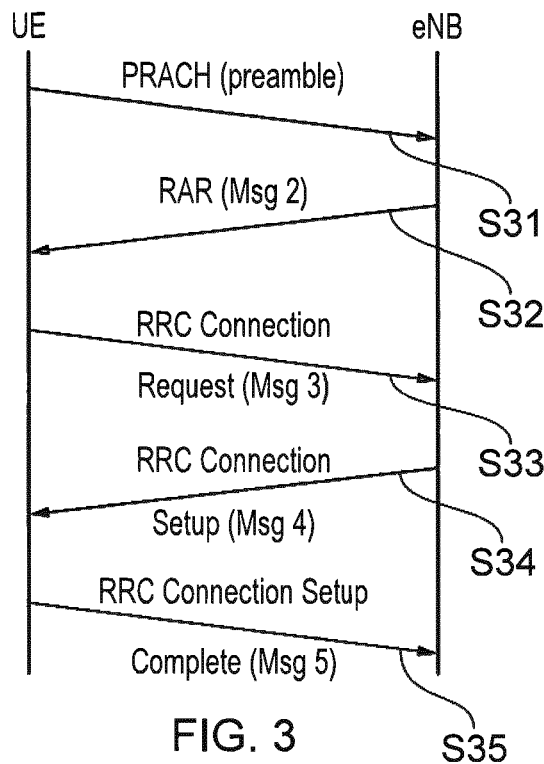
FIG. 3 schematically represents a first example random access procedure for use by different types of terminal device.

FIG. 3 is a ladder diagram that schematically shows message exchange between a UE and an eNodeB in a typical random access procedure to establish an RRC connection, in this example in an LTE-based network. The UE starts the process in step S31 by transmitting a random access request on a physical random access channel (PRACH in an LTE context), i.e. a random access preamble (RACH preamble), to the eNodeB. In step S32, when the eNodeB detects this preamble it will respond with a Random Access Response message (RAR), which is also known as Message 2. The RAR is scheduled by downlink control information (DCI) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step S31, and the RAR will indicate which preamble the eNodeB has detected and is responding to. It may be noted that it is possible that multiple UEs may transmit a random access request using the same PRACH preamble and in the same time and frequency resources. The RAR of step S32 also contains an uplink grant for the preamble the network is responding to so that the UE that transmitted the preamble may use this uplink grant to transmit an RRC Connection Request message, also known as Message 3 to the eNodeB, in step S33. Message 3 also contains an indication of an identifier, ID, for the UE (e.g. a C-RNTI (cell radio network temporary identifier) or S-TMSI (system architecture evolution (SAE) temporary mobile subscriber identity) or a 40-bit random number generated by the UE. The eNodeB will respond to Message 3, in step S34, with Message 4 which carries an RRC Connection Setup message. For the case where multiple UEs use the same preamble, Message 4 provides contention resolution functionality, for example using a terminal device identifier, such as C-RNTI or S-TMSI, transmitted in Message 3 (when a UE receives a Message 4 that contains a portion of the Message 3 containing the UE ID that it transmitted earlier, it knows that there was no contention on the Message 3 that it had transmitted). The RRC connection is complete when the UE transmits Message 5 in step S35 containing an RRC Connection Setup Complete message.

One of the many uses for IoT devices is to provide infrequent reports and receive infrequent commands from the network, where such devices are for example sensors and utility meters, and the IoT device (i.e. UE) is expected to be in power saving mode or long DRX most of the time to conserve battery power. Hence, when there is data to transmit or receive, due to the long DRX, the UE would need to reacquire synchronisation, update system information and connect to the network to perform the data exchange, which can take a long time and therefore consume a lot of battery power. Recognising this, in Rel-15, as described above, Early Data Transmission (EDT) is introduced in the uplink, which allows the UE to transmit data to the network during the RRC connection process. In the message exchange shown in FIG. 3, the uplink EDT is transmitted using Message 3 and the UE can move back to idle mode after Message 4. This would avoid the need to establish an RRC connection, and hence reduces power consumption.

Figure 4:
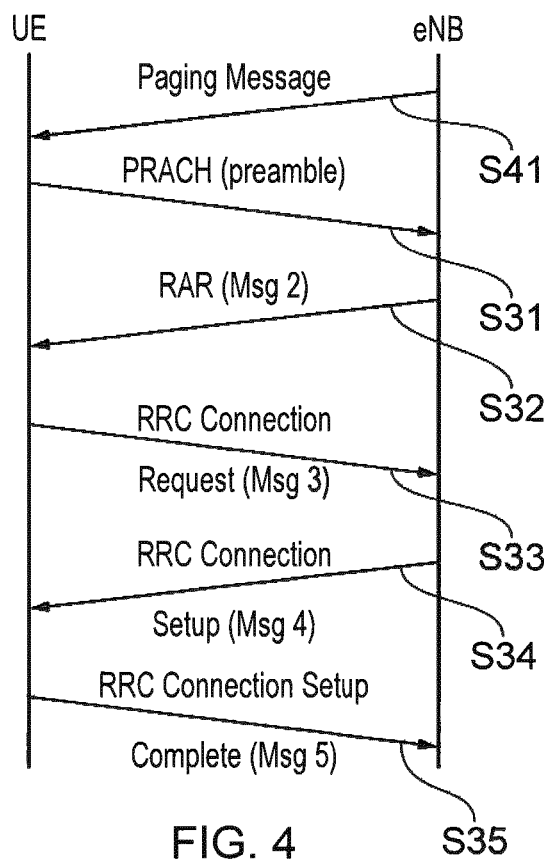
FIG. 4 schematically represents a second example random access procedure for use by different types of terminal device in response to a paging message.

In Rel-16 A-MTC and A-NB-IoT, EDT is further developed to include Mobile Terminated (MT) data, i.e. downlink EDT. Similarly to uplink EDT in Rel-15, downlink EDT can be used by the network to transmit data to the UE without the need to establish an RRC connection. For MT data, the network initiates the RRC connection process by paging the UE and this is followed by a Random Access procedure as shown in FIG. 4, which is similar to that in FIG. 3 but starts with a paging message S41 instead of a PRACH, which is transmitted by UE once it has been paged. Note that the sequence shown in FIG. 4 shows the standard procedure of sending downlink (DL) MT data to the UE without the EDT process. The following steps of FIG. 4 are substantially equivalent to steps S31 to S35 of FIG. 3.

Downlink EDT using Message 4 is concluded to be possible in Rel-15 without any specification impacts. Co-pending patent applications describe solutions related to transmitting Downlink EDT, both over the paging message in [10] and using Message 2 in [11], the contents of each of which are hereby incorporated by reference. It is proposed that a known preamble is transmitted from the UE to the network after receiving an EDT from the paging message in [10] or after receiving an EDT via message 2 in [11]. This known preamble would provide a layer 1 acknowledgement for the transmission.

Figure 5:
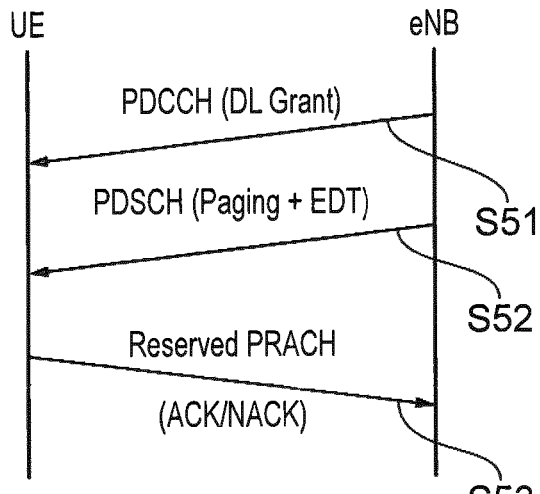
FIG. 5 schematically represents a first example signalling diagram for using a reserved preamble as an ACK/NACK.
Figure 6:
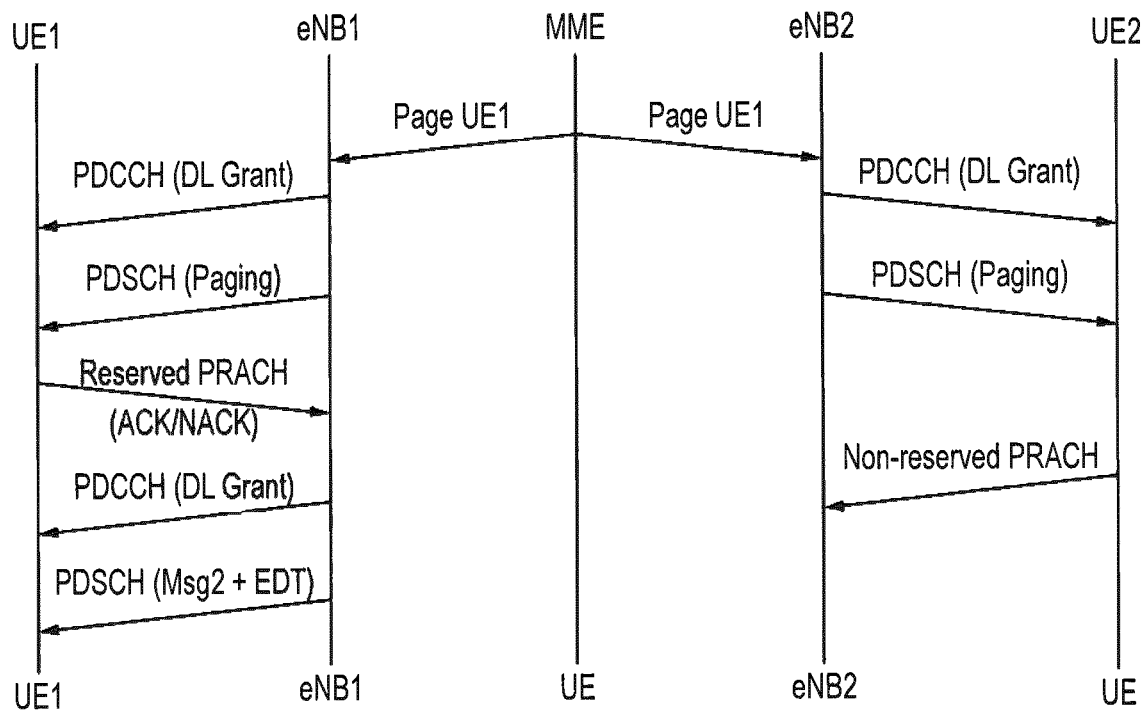
FIG. 6 schematically represents a second example signalling diagram for using a reserved preamble to identify the UE to the network.

The example implementation of downlink EDT using the paging message as described in [10] is shown in FIG. 5. Here, the UE is firstly configured to receive DL EDT, and its UE context data (containing IDs, security keys, etc.) is stored when the UE moves into Idle mode or Inactive state. The eNB then sends a DL grant via a PDCCH in step S51 during the UE's paging occasion (PO), where this DL Grant would indicate that the following PDSCH in step S52 contains downlink EDT. A preamble is also indicated in the DL Grant (S51) or the paging message containing the EDT (S52), where the UE would then use the indicated (or reserved) preamble to feedback an acknowledgement to the network at a predetermined time in step S53. It is recognised that in idle mode or inactive state, the location of the UE at the cell level may not be known to the network, and a page may be performed over several cells in a tracking area. Hence, in [11] it is proposed that the DL EDT be transmitted over Message 2. An example implementation is shown in FIG. 6, where the MME firstly pages UE1 over several cells within a tracking area (here we show eNB1 and eNB2). In the page, the network notifies the target UE, i.e. UE1, that a DL EDT is scheduled for the UE in Message 2 and also indicates a preamble for the UE to use to identify itself to the network. UE1 is in eNB1 and receives the paging message but instead of responding with a randomly chosen PRACH (preamble), UE1 uses the indicated (or reserved PRACH) to identify itself to the network. The network then knows that UE1 is in eNB1 and transmits the EDT to that UE. Meanwhile, eNB2 also performs the page but no UE responded with the reserved PRACH. Here for completeness, a UE2 sends a random PRACH which is not the reserved PRACH and so the network will respond with a legacy RRC Connection procedure for that UE2. Hence it can be appreciated that using the reserved PRACH, the network can identify the cell and the target UE that is receiving the downlink EDT otherwise. Without the reserved preamble, the network would not be able to tell which UE is performing the PRACH since it could be another UE that has uplink data to transmit or it could be the UE responding to that page.

However, in addition to layer 1 acknowledgements, it is recognised that typically an application would expect an acknowledgement from the UE after transmission of the EDT. Embodiments of the present technique address the feedback for downlink EDT.

Feedback for Downlink Early Data Transmission in MTC

Figure 7:
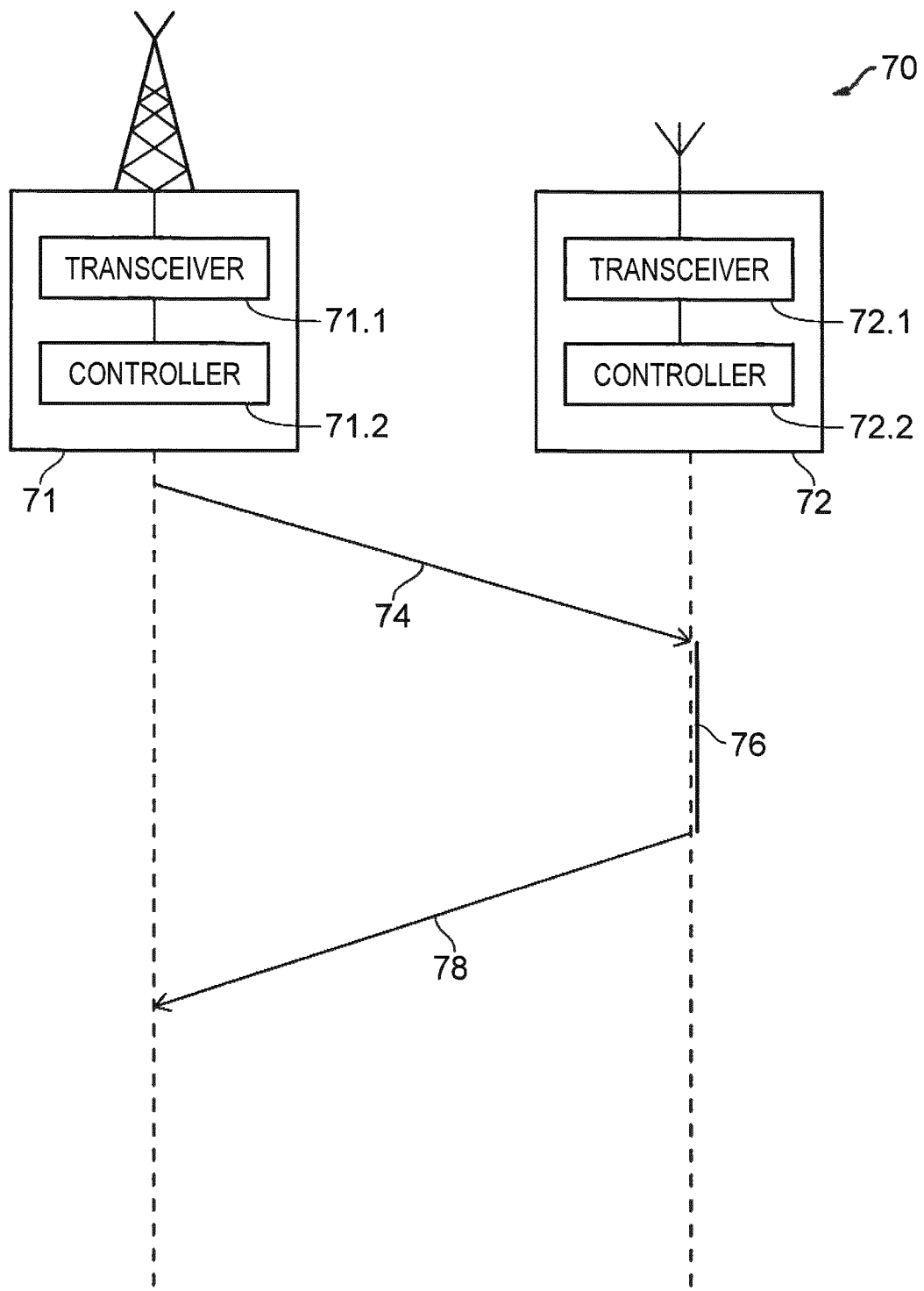
FIG. 7 shows a part schematic, part message flow diagram representation of a wireless communications network comprising an infrastructure equipment and a communications device in accordance with embodiments of the present technique.

FIG. 7 shows a part schematic, part message flow diagram representation of a wireless communications network 70 comprising an infrastructure equipment 71 and a communications device 72 in accordance with embodiments of the present technique. The communications device 72 is configured to receive user plane data from the wireless communications network 70 when the communications device is not in an active radio resource connected mode The infrastructure equipment 71 and the communications device 72 each comprise a transceiver (or transceiver circuitry) 71.1, 72.1, and a controller (or controller circuitry) 71.2, 72.2. Each of the controllers 71.2, 72.2 may be, for example, a microprocessor, a CPU, or a dedicated chipset, etc.

The transceiver circuitry 72.1 and the controller circuitry 72.2 of the communications device 72 are configured in combination to receive 74 one of paging signalling and a random access procedure message (e.g. message 2) from the wireless communications network 70 (i.e. from the infrastructure equipment 71), wherein the one of the paging signalling and the random access procedure message comprises an indication that the wireless communications network 70 has user plane data for transmission to the communications device 72 while the communications device 72 is not in an active radio resource connected mode, determining 76 from the one of the paging signalling and the random access procedure message a set of radio resources on which the user plane data is to be transmitted by the wireless communications network 70 to the communications device 72, wherein the user plane data is to be received by the communications device 72 from the wireless communications network 70 as part of a random access procedure, and transmitting 78 to the wireless communications network 70 (i.e. to the infrastructure equipment 71) an indication of whether or not the communications device 72 successfully received the user plane data using the determined set of radio resources.

This user plane message is, for example, a downlink EDT message. In the case of the downlink EDT being received successfully, the transceiver circuitry 72.1 and the controller circuitry 72.2 of the communications device 72 are configured in combination to receive the user plane data from the wireless communications network using the determined set of radio resources while the communications device is not in an active radio resource connected mode, wherein the transmitted indication of whether or not the communications device successfully received the user plane data using the determined set of radio resources indicates that the communications device has successfully received the user plane data using the determined set of radio resources. In the case of the downlink EDT not being received successfully, the transceiver circuitry 72.1 and the controller circuitry 72.2 of the communications device 72 are configured in combination to determine that the user plane data has not been successfully received from the wireless communications network using the determined set of radio resources while the communications device is not in an active radio resource connected mode, wherein the transmitted indication of whether or not the communications device successfully received the user plane data using the determined set of radio resources indicates that the communications device has not successfully received the user plane data using the determined set of radio resources.

Essentially, embodiments of the present technique define ways in which an acknowledgement may be provided to downlink EDTs in the third message (e.g. msg 3) of the RACH procedure. The third message is the message after the PRACH in the uplink and the RAR (Message 2) in the downlink, i.e. it is equivalent to but not necessarily Message 3 in FIG. 4. This said third message acknowledgement is applicable for downlink EDT carried in the paging message or in Message 2. In other words, the indication is transmitted using a third message of the random access procedure. It should also be appreciated that the DL EDT transmission over Message 2 may or may not use the method described in [11], i.e. the DL EDT can be carried by Message 2 without the need of a notification in the paging message (or a reserved preamble).

Physical Layer Acknowledgement

The following arrangements of embodiments of the present technique comprise layer 1 (i.e. physical layer) acknowledgements of the downlink EDT. In an example implementation, the layer 1 acknowledgement is sent if the network indicated that it does not require an application acknowledgement. In another example implementation, the layer 1 may need to send a Negative Acknowledgement (NACK) to the network if it fails to receive the downlink EDT and hence unable to transmit the application acknowledgement using the uplink EDT. In another example implementation, layer 1 acknowledgement is sent regardless of whether an application acknowledgement is required.

In an arrangement of embodiments of the present technique, the third Message is a PUCCH (i.e. the indication is transmitted using a physical uplink control channel). That is instead of sending a PUSCH containing Message 3 to the network, a smaller ACK/NACK feedback in the form of PUCCH can be used. This will reduce the transmission time required to transmit the ACK/NACK in the case where the UE is in a coverage enhanced area requiring multiple repetitions. The eNodeB would expect to receive a PUCCH instead of a PUSCH from the UE. The resources for this said PUCCH can be:

The same PUCCH resources configured for HARQ-ACK feedbacks for Message 4.
SIB defines a set of PUCCH resources for the purposes of acknowledging the downlink EDT This arrangement enables HARQ (re)transmission to be used for the DL EDT. That is, the UE is able to feedback ACK/NACK and can expect a DL grant for a retransmission.

It will be appreciated that there are cases where the UE does not know of the resources to use for feedback signalling. For example, when the resources to be used for the feedback signalling are indicated in Msg2 and the DL EDT is transmitted in Msg2, if Msg2 is not received correctly by the UE, the UE cannot parse the (unreceived) Msg2 to determine the resources used for feedback signalling. In such cases, the UE will not explicitly transmit feedback signalling indicating NACK, and the eNB will determine that the UE failed to receive EDT in Msg2 through observing discontinuous transmission (DTX) when attempting to decode the feedback signalling. Determination of discontinuous transmission/did not transmit detection can be performed using known techniques, such as performing measurements on reference signals associated with the feedback signalling. Hence in some arrangements of embodiments of the present technique, the eNB may implicitly determine a NACK for the feedback signalling by decoding DTX on the feedback signalling—i.e. the received indication of whether or not the communications device successfully received the user plane data using the determined set of radio resources comprises a period of discontinuous transmission by the communications device, and the infrastructure equipment is configured to determine, based on the detection of the period of discontinuous transmission, that the communications device did not successfully receive the user plane data.

In another arrangement of embodiments of the present technique, if Message 3 is transmitted (e.g. instead of a PUCCH ACK), then it indicates that the UE failed to receive the DL EDT and hence requires a retransmission. In other words, the transmission of the third message (in this case for example containing an RRC connection request message) indicates that the communications device has not successfully received the user plane data using the determined set of radio resources. The DL EDT retransmission can be transmitted in Message 4.

Figure 8:
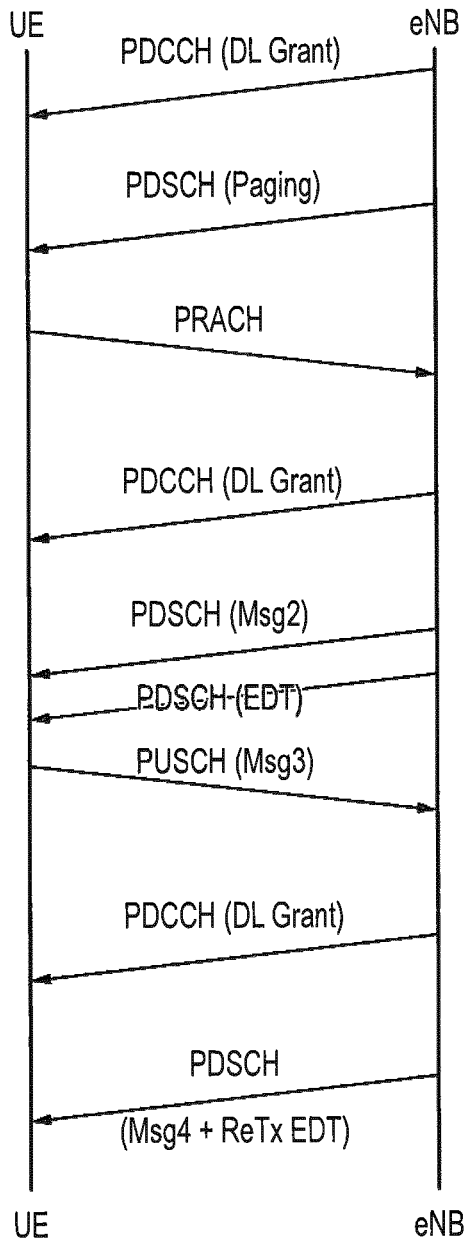
FIG. 8 schematically represents an example random access procedure in accordance with embodiments of the present technique, where message 3 is used as a NACK indication for retransmission of a downlink Early Data Transmission (EDT)

In arrangements where the resources to be used for Message 3 are signalled separately to those used for the DL EDT, it is possible for the UE to transmit either an ACK to the eNodeB or a NACK. An example implementation is shown in FIG. 8, where a DL EDT is transmitted using Message 2. Here, the network pages the UE using a legacy paging message and the UE responds with a PRACH (non-reserved). Message 2 is transmitted in a first PDSCH and contains a DL grant for DL EDT transmitted in a second PDSCH. After receiving the DL EDT, the UE decodes the message and so, in accordance with this arrangement transmits a Message 3 (the resources for which were derived from the DL grant in the first PDSCH), which indicates that it failed to receive the DL EDT. The eNodeB then responds with a Message 4 with a retransmission of the DL EDT.

When the network pages a UE for conventional paging, for downlink EDT over paging and for downlink EDT over Message 2, it typically includes the targeted UE ID in the paging message. This ID can be an IMSI or a (40 bits) S-TMSI. In the existing system the UE includes a 40 bit ID in its Message 3 which can be the S-TMSI, C-RNTI (e.g. for non-contention based transmission) or a randomly generated ID. In an arrangement of embodiments of the present technique, when the UE includes the S-TMSI or a truncated IMSI that is indicated in the paging message, this would act as an ACK for downlink EDT. It should be noted that is a layer 1 acknowledgement. In other words, the third message includes a first identifier associated with the communications device, the first identifier indicating that the communications device has successfully received the user plane data using the determined set of radio resources.

Figure 9:
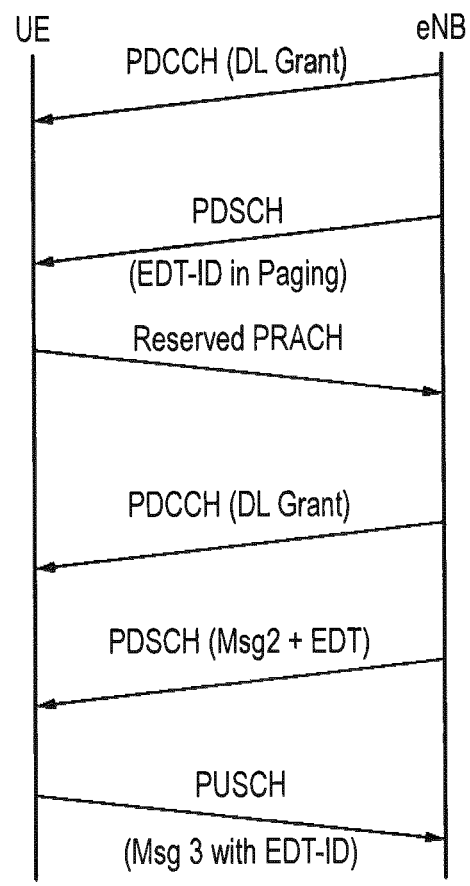
FIG. 9 schematically represents a second example random access procedure in accordance with embodiments of the present technique, where message 3 is used, with an attached ID, to indicate layer 1 acknowledgement.

In another arrangement of embodiments of the present technique, the paging message may include a new ID such as an EDT-ID or the PDCCH scheduling the paging message may use a different RNTI (e.g. EDT-RNTI). In this arrangement, the UE acknowledges the network by including this said new ID (EDT-ID or EDT-RNTI) in its Message 3 as an acknowledgement ID to the downlink EDT. In other words, the third message includes a first identifier associated with the user plane data, the first identifier indicating that the communications device has successfully received the user plane data using the determined set of radio resources. An example is shown in FIG. 9, where the downlink EDT is transmitted using Message 2. The paging message indicates an upcoming downlink EDT in Message 2 and here this is indicated using a new ID in the paging message, namely an EDT-ID. The UE responds using a reserved PRACH and receives the corresponding downlink EDT from Message 2. It then transmits a Message 3 attaching the EDT-ID in the message to indicate layer 1 acknowledgement. It should be noted that currently the UE IDs (InitialUE-Identity) available in Message 3 are the S-TMSI or a Random Value of size 40 bits. This arrangement would require a modification of Message 3 to either add a new choice of UE ID or replace an existing one.

In another arrangement of embodiments of the present technique, the positive acknowledgement ACK is indicated by attaching the S-TMSI or EDT-ID in Message 3 as previously described above. However, here, the negative acknowledgement NACK is indicated by using another ID that is derived via a predefined function from the S-TMSI or EDT-ID. In other words, the NACK ID is derived from the ACK ID. For example an inverse of the ID can be used, that is if EDT-ID is 1110001110 then the NACK is indicated as 0001110001 (i.e. the inverse of ACK). Other predefined functions can be used. In these arrangements therefore, the communications device is configured to a second identifier by carrying out a predetermined function on a first identifier (associated with the communications device or with the user plane data), wherein the third message includes the second identifier, the second identifier indicating that the communications device has not successfully received the user plane data using the determined set of radio resources.

In an arrangement of embodiments of the present technique, the ID that the UE uses to indicate ACK/NACK via Message 3 is signalled in Message 2, in the RAR or as part of the downlink EDT message. In other words, the first identifier is signalled by the wireless communications network to the communications device using a random access response message, the random access response message being a second message of the random access procedure.

In another arrangement of embodiments of the present technique, if the UE indicates a NACK in Message 3, e.g. according to one of the previous arrangements, the DL EDT is transmitted in Message 4. In other words, the communications device is configured to receive, subsequent to the communications device indicating that the communications device has not successfully received the user plane data using the determined set of radio resources, the user plane data from the wireless communications network using a different set of radio resources to the determined set of radio resources while the communications device is not in an active radio resource connected mode using a fourth message of the random access procedure. If no ACK or NACK is received at the infrastructure equipment from the communications device, for example because the DL EDT is transmitted along with the indication of resources in which to acknowledge it and this is not successfully received by the communications device, the infrastructure equipment may execute a legacy PRACH procedure. The eNodeB may do so in response to detecting DTX from the UE when attempting to decode the feedback signalling.

Application Layer Acknowledgement

In an arrangement of embodiments of the present technique, the transmission of the downlink EDT indicates whether an application layer response is required in the uplink, where this application layer acknowledgement is transmitted using the said third message. This indicator can be indicated in the DCI scheduling the downlink EDT (whether the DL EDT is carried by the paging message or by the RAR), e.g.:

Explicitly indicated in the DCI using a new field,
Implicitly indicated in the DCI using an unused state, or
Indicated using a predetermined RNTI for the DCI.

In other words, the paging signalling comprises an indication that the communications device should transmit an application layer response to the wireless communications network providing an indication that the communications device successfully received the user plane data using the determined set of radio resources. Alternatively, the communications device is configured to receive a random access response message from the wireless communications network, the random access response message being a second message of the random access procedure and comprising an indication that the communications device should transmit an application layer response to the wireless communications network providing an indication that the communications device successfully received the user plane data using the determined set of radio resources.

Alternatively, this indication can be indicated in the message carrying the downlink EDT, for example:

For the case where downlink EDT is carried by a paging message, it can be indicated in a new IE of the message,
For the case where downlink EDT is carried by Message 2, it can be indicated in the MAC (medium access control) header, or
Use can be made of the reserved bit in the RAR (when RAR is transmitted). Currently the reserved bit is used to indicate uplink EDT over message 3 in response to a UE request for uplink EDT (note, currently, the UE uses a reserved preamble to request for UL EDT over Message 3). Here the UE may not request for uplink EDT (using another set of reserved preambles) but is indicated, using this reserved bit, to use uplink EDT over Message 3.

In other words, the communications device is configured to receive the user plane data from the wireless communications network as part of a downlink message using the determined set of radio resources while the communications device is not in an active radio resource connected mode, wherein the downlink message also comprises an indication that the communications device should transmit an application layer response to the wireless communications network providing an indication that the communications device successfully received the user plane data using the determined set of radio resources.

Figure 10:
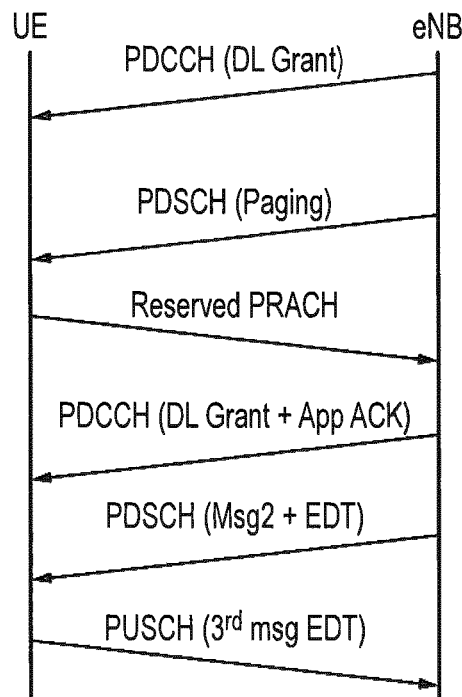
FIG. 10 schematically represents a third example random access procedure in accordance with embodiments of the present technique, where an application layer response using EDT is transmitted by a terminal device in message 3.

When it is indicated that the downlink EDT requires an application layer response, an uplink EDT over Message 3 is scheduled. That is the UE would be given an uplink EDT grant to carry this application layer response. In other words, this said indication is an indicator for an uplink EDT. An example is shown in FIG. 10, where here the downlink EDT is transmitted over Message 2. As per this embodiment, an indication for an application layer response is signalled in the DCI carrying the downlink grant for Message 2. The UE receiving the downlink EDT recognises this said indicator and hence would also extract the uplink grant from Message 2 (e.g. the RAR) that schedules the uplink EDT and transmit the corresponding application layer responses using the uplink EDT. Should the UE not successfully receive the EDT, then as described above, the eNodeB may implicitly determine a NACK for the feedback signalling by decoding DTX on the feedback signalling.

There are some cases where the eNodeB is unable to determine that an application layer ACK is required in response to the EDT. Hence in an arrangement of embodiments of the present technique, the eNodeB provides a time window over which the UE can transmit a Msg3 using PUSCH (for example over uplink grant free resources). During this time window, the timing advance and power control procedures of the UE are likely to be constant. Hence the UE processes PDSCH (Msg2+EDT), according to its own application layer processing timeline (i.e. based on however long the application layer takes to creates a response) and then transmits the application layer response during the assigned time window. In other words, the communications device is configured to receive the user plane data from the wireless communications network using the determined set of radio resources while the communications device is not in an active radio resource connected mode, to determine that an application layer acknowledgement should be transmitted by the communications device to the wireless communications network, and to transmit the application layer acknowledgement to the wireless communications network during a time period specified by the wireless communications network. It should be noted that in this arrangement, it is the UE that determines whether to transmit the application layer ACK (since the eNodeB is unable to determine this). If the UE does not derive an application layer ACK within the aforementioned time period, in an arrangement, the UE instead sends an acknowledgement of the Message 2 and/or DL EDT.

This acknowledgement can take the form of an RRC message transmitted via a PUSCH within the time period or a predefined sequence transmitted within the time period. In this way, the eNodeB can determine that the DL EDT had been received by the UE. If the UE derives an application layer ACK after the time period has expired, the UE can initiate a legacy RACH procedure in order to transmit the application layer ACK. Note also that the eNodeB can assign resources during the time window to one or more UEs; if more than one UE is assigned resources, there may be some contention on the transmission of such application layer acknowledgements.

Further Aspects

The above described arrangements use Message 3 for the acknowledgement of the EDT message. In another arrangement, in which a preamble is used to acknowledge a downlink EDT or to acknowledge the notification of a downlink EDT in Message 2 as described in [11], this said preamble is a preamble selected from a pool of existing PRACH preambles. That is the network reserves a set of PRACH preambles for the acknowledgement of downlink EDT carried by the paging message. This set of PRACH preambles is configured by RRC e.g. broadcast in the SIBs. In other words, the indication is transmitted using a preamble signal selected from a plurality of specified preamble signals.

In co-pending application [10], the paging message indicates a specific preamble for use in acknowledging the downlink EDT carried during the paging stage or in Message 2. In another arrangement of embodiments of the present technique, the paging message does not need to indicate a specific preamble. Here, the number of reserved preambles for the use of acknowledging the downlink EDT is small. For example, if there are only 2 reserved preambles, one for ACK and another for NACK, for the case of acknowledging the EDT in the paging message, then there is no need to indicate which reserved preamble to use. In other words, the selected preamble signal is selected depending on whether the indication is that the communications device has successfully received the user plane data using the determined set of radio resources or whether the indication is that the communications device has not successfully received the user plane data using the determined set of radio resources. For the case of EDT notification in Message 2, only 1 reserved preamble is required. Different cells can use different sets of reserved preambles.

In the case of the preamble being used to acknowledge the notification of a downlink EDT in Message 2, the communications device is configured to transmit the indication in response to receiving, from the wireless communications network, a notification that the user plane data will be transmitted by the wireless communications network to the communications device, the notification being received as part of a random access response message, the random access response message being a second message of the random access procedure.

Flow Chart Representation

Figure 11:
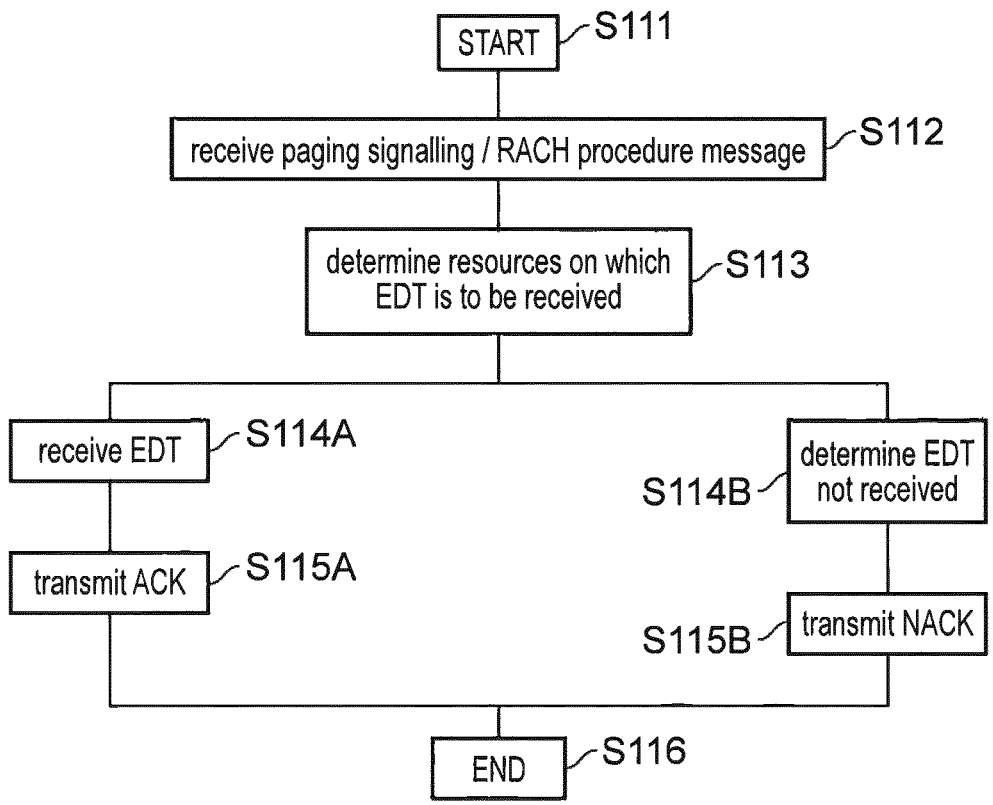
FIG. 11 is a flow diagram representation of a method of operating a communications device according to embodiments of the present technique.

FIG. 11 shows a flow diagram illustrating a method of operating a communications device for receiving user plane data from a wireless communications network when the communications device is not in an active radio resource connected mode.

The method begins in step S111. The method comprises, in step S112, receiving one of paging signalling and a random access procedure message from the wireless communications network, wherein the one of the paging signalling and the random access procedure message comprises an indication that the wireless communications network has user plane data for transmission to the communications device while the communications device is not in an active radio resource connected mode. In step S113, the process comprises determining from the one of the paging signalling and the random access procedure message a set of radio resources on which the user plane data is to be transmitted by the wireless communications network to the communications device, wherein the user plane data is to be received by the communications device from the wireless communications network as part of a random access procedure. The method then advances to step S114, which comprises, in branch S114A, receiving the user plane data from the wireless communications network using the determined set of radio resources while the communications device is not in an active radio resource connected mode. In branch S114B, the method comprises determining that the user plane data has not been successfully received from the wireless communications network using the determined set of radio resources while the communications device is not in an active radio resource connected mode. Accordingly, the process comprises in step S115A or S115B respectively, transmitting to the wireless communications network an indication of whether or not the communications device successfully received the user plane data using the determined set of radio resources. The process ends in step S116.

Those skilled in the art would appreciate that the method shown by FIG. 11 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating a communications device for receiving user plane data from a wireless communications network when the communications device is not in an active radio resource connected mode, the method comprising receiving one of paging signalling and a random access procedure message from the wireless communications network, wherein the one of the paging signalling and the random access procedure message comprises an indication that the wireless communications network has user plane data for transmission to the communications device while the communications device is not in an active radio resource connected mode, determining from the one of the paging signalling and the random access procedure message a set of radio resources on which the user plane data is to be transmitted by the wireless communications network to the communications device, wherein the user plane data is to be received by the communications device from the wireless communications network as part of a random access procedure, and transmitting to the wireless communications network an indication of whether or not the communications device successfully received the user plane data using the determined set of radio resources.

Paragraph 2. A method according to Paragraph 1, comprising receiving the user plane data from the wireless communications network using the determined set of radio resources while the communications device is not in an active radio resource connected mode, wherein the transmitted indication of whether or not the communications device successfully received the user plane data using the determined set of radio resources indicates that the communications device has successfully received the user plane data using the determined set of radio resources.

Paragraph 3. A method according to Paragraph 1 or Paragraph 2, comprising determining that the user plane data has not been successfully received from the wireless communications network using the determined set of radio resources while the communications device is not in an active radio resource connected mode, wherein the transmitted indication of whether or not the communications device successfully received the user plane data using the determined set of radio resources indicates that the communications device has not successfully received the user plane data using the determined set of radio resources.

Paragraph 4. A method according to any of Paragraphs 1 to 3, wherein the indication is transmitted using a physical uplink control channel.

Paragraph 5. A method according to any of Paragraphs 1 to 4, wherein the indication is transmitted using a third message of the random access procedure.

Paragraph 6. A method according to Paragraph 5, wherein the transmission of the third message indicates that the communications device has not successfully received the user plane data using the determined set of radio resources.

Paragraph 7. A method according to Paragraph 5 or Paragraph 6, wherein the third message includes a first identifier associated with the communications device, the first identifier indicating that the communications device has successfully received the user plane data using the determined set of radio resources.

Paragraph 8. A method according to any of Paragraphs 5 to 7, wherein the third message includes a first identifier associated with the user plane data, the first identifier indicating that the communications device has successfully received the user plane data using the determined set of radio resources.

Paragraph 9. A method according to any of Paragraphs 5 to 8, comprising calculating a second identifier by carrying out a predetermined function on a first identifier associated with the communications device, wherein the third message includes the second identifier, the second identifier indicating that the communications device has not successfully received the user plane data using the determined set of radio resources.

Paragraph 10. A method according to any of Paragraphs 5 to 9, comprising calculating a second identifier by carrying out a predetermined function on a first identifier associated with the user plane data, wherein the third message includes the second identifier, the second identifier indicating that the communications device has not successfully received the user plane data using the determined set of radio resources.

Paragraph 11. A method according to any of Paragraphs 7 to 10, wherein the first identifier is signalled by the wireless communications network to the communications device using a random access response message, the random access response message being a second message of the random access procedure.

Paragraph 12. A method according to any of Paragraphs 3 to 11, comprising receiving, subsequent to the communications device indicating that the communications device has not successfully received the user plane data using the determined set of radio resources, the user plane data from the wireless communications network using a different set of radio resources to the determined set of radio resources while the communications device is not in an active radio resource connected mode using a fourth message of the random access procedure.

Paragraph 13. A method according to any of Paragraphs 1 to 12, wherein the paging signalling comprises an indication that the communications device should transmit an application layer response to the wireless communications network providing an indication that the communications device successfully received the user plane data using the determined set of radio resources.

Paragraph 14. A method according to any of Paragraphs 1 to 13, comprising receiving a random access response message from the wireless communications network, the random access response message being a second message of the random access procedure and comprising an indication that the communications device should transmit an application layer response to the wireless communications network providing an indication that the communications device successfully received the user plane data using the determined set of radio resources.

Paragraph 15. A method according to any of Paragraphs 1 to 14, comprising receiving the user plane data from the wireless communications network as part of a downlink message using the determined set of radio resources while the communications device is not in an active radio resource connected mode, wherein the downlink message comprises an indication that the communications device should transmit an application layer response to the wireless communications network providing an indication that the communications device successfully received the user plane data using the determined set of radio resources.

Paragraph 16. A method according to any of Paragraphs 1 to 15, comprising receiving the user plane data from the wireless communications network using the determined set of radio resources while the communications device is not in an active radio resource connected mode, determining that an application layer acknowledgement should be transmitted by the communications device to the wireless communications network, and transmitting the application layer acknowledgement to the wireless communications network during a time period specified by the wireless communications network.

Paragraph 17. A method according to any of Paragraphs 1 to 16, wherein the indication is transmitted using a preamble signal selected from a plurality of specified preamble signals.

Paragraph 18. A method according to Paragraph 17, wherein the selected preamble signal is selected depending on whether the indication is that the communications device has successfully received the user plane data using the determined set of radio resources or whether the indication is that the communications device has not successfully received the user plane data using the determined set of radio resources.

Paragraph 19. A method according to Paragraph 17 or Paragraph 18, comprising transmitting the indication in response to receiving, from the wireless communications network, a notification that the user plane data will be transmitted by the wireless communications network to the communications device, the notification being received as part of a random access response message, the random access response message being a second message of the random access procedure.

Paragraph 20. A communications device for receiving user plane data from a wireless communications network when the communications device is not in an active radio resource connected mode, the communications device comprising transceiver circuitry and controller circuitry configured in combination to receive one of paging signalling and a random access procedure message from the wireless communications network, wherein the one of the paging signalling and the random access procedure message comprises an indication that the wireless communications network has user plane data for transmission to the communications device while the communications device is not in an active radio resource connected mode, to determine from the one of the paging signalling and the random access procedure message a set of radio resources on which the user plane data is to be transmitted by the wireless communications network to the communications device, wherein the user plane data is to be received by the communications device from the wireless communications network as part of a random access procedure, and to transmit to the wireless communications network an indication of whether or not the communications device successfully received the user plane data using the determined set of radio resources.

Paragraph 21. Circuitry for a communications device for receiving user plane data from a wireless communications network when the communications device is not in an active radio resource connected mode, the communications device comprising transceiver circuitry and controller circuitry configured in combination to receive one of paging signalling and a random access procedure message from the wireless communications network, wherein the one of the paging signalling and the random access procedure message comprises an indication that the wireless communications network has user plane data for transmission to the communications device while the communications device is not in an active radio resource connected mode, to determine from the one of the paging signalling and the random access procedure message a set of radio resources on which the user plane data is to be transmitted by the wireless communications network to the communications device, wherein the user plane data is to be received by the communications device from the wireless communications network as part of a random access procedure, and to transmit to the wireless communications network an indication of whether or not the communications device successfully received the user plane data using the determined set of radio resources.

Paragraph 22. A method of operating an infrastructure equipment forming part of a wireless communications network for transmitting user plane data to the communications device when the communications device is not in an active radio resource connected mode, the method comprising transmitting one of paging signalling and a random access procedure message to the communications device, wherein the one of the paging signalling and the random access procedure message comprises an indication that the wireless communications network has user plane data for transmission to the communications device while the communications device is not in an active radio resource connected mode and an indication of a set of radio resources on which the user plane data is to be transmitted by the wireless communications network to the communications device, wherein the user plane data is to be received by the communications device from the wireless communications network as part of a random access procedure, transmitting the user plane data to the communications device using the determined set of radio resources while the communications device is not in an active radio resource connected mode, and receiving from the communications device an indication of whether or not the communications device successfully received the user plane data using the determined set of radio resources.

Paragraph 23. A method according to Paragraph 22, wherein the received indication of whether or not the communications device successfully received the user plane data using the determined set of radio resources comprises a period of discontinuous transmission by the communications device, and the method comprises determining, based on the detection of the period of discontinuous transmission, that the communications device did not successfully receive the user plane data.

Paragraph 24. An infrastructure equipment forming part of a wireless communications network for transmitting user plane data to the communications device when the communications device is not in an active radio resource connected mode, the infrastructure equipment comprising transceiver circuitry and controller circuitry configured in combination to transmit one of paging signalling and a random access procedure message to the communications device, wherein the one of the paging signalling and the random access procedure message comprises an indication that the wireless communications network has user plane data for transmission to the communications device while the communications device is not in an active radio resource connected mode and an indication of a set of radio resources on which the user plane data is to be transmitted by the wireless communications network to the communications device, wherein the user plane data is to be received by the communications device from the wireless communications network as part of a random access procedure, to transmit the user plane data to the communications device using the determined set of radio resources while the communications device is not in an active radio resource connected mode, and to receive from the communications device an indication of whether or not the communications device successfully received the user plane data using the determined set of radio resources.

Paragraph 25. Circuitry for an infrastructure equipment forming part of a wireless communications network for transmitting user plane data to the communications device when the communications device is not in an active radio resource connected mode, the infrastructure equipment comprising transceiver circuitry and controller circuitry configured in combination to transmit one of paging signalling and a random access procedure message to the communications device, wherein the one of the paging signalling and the random access procedure message comprises an indication that the wireless communications network has user plane data for transmission to the communications device while the communications device is not in an active radio resource connected mode and an indication of a set of radio resources on which the user plane data is to be transmitted by the wireless communications network to the communications device, wherein the user plane data is to be received by the communications device from the wireless communications network as part of a random access procedure, to transmit the user plane data to the communications device using the determined set of radio resources while the communications device is not in an active radio resource connected mode, and to receive from the communications device an indication of whether or not the communications device successfully received the user plane data using the determined set of radio resources.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, 3GPP TSG RAN Meeting #73, New Orleans, USA, Sep. 19-22, 2016.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170732, "New WID on Even further enhanced MTC for LTE," Ericsson, Qualcomm, 3GPP TSG RAN Meeting #75, Dubrovnik, Croatia, Mar. 6-9, 2017.
[4] RP-170852, "New WID on Further NB-IoT enhancements," Huawei, HiSilicon, Neul, 3GPP TSG RAN Meeting #75, Dubrovnik, Croatia, Mar. 6-9, 2017.
[5] RP-181450, "New WID on Rel-16 MTC enhancements for LTE," Ericsson, 3GPP TSG RAN Meeting #80, La Jolla, USA, Jun. 11-14, 2018.
[6] RP-181451, "New WID on Rel-16 enhancements for NB-IoT," Ericsson, Huawei, 3GPP TSG RAN Meeting #80, La Jolla, USA, Jun. 11-14, 2018.
[7] Holma H. and Toskala A, "LTE for UMTS OFDMA and SC-FDMA based radio access", John Wiley and Sons, 2009.
[8] RP-172834, "Revised WID on New Radio Access Technology," NTT DOCOMO, RAN #78.
[9] TR 38.913, "Study on Scenarios and Requirements for Next Generation Access Technologies (Release 14)", 3rd Generation Partnership Project.
[10] International Patent Application number PCT/EP2017/069003, Sony Corporation et al.
[11] International Patent Application number PCT/EP2017/080828, Sony Corporation et al.

What is claimed is:

1. A method of operating a communications device for receiving user plane data from a wireless communications network when the communications device is not in an active radio resource connected mode, the method comprising:

receiving one of paging signalling and a random access procedure message from the wireless communications network, wherein the one of the paging signalling and the random access procedure message includes a first indication that the wireless communications network has user plane data for transmission to the communications device while the communications device is not in the active radio resource connected mode, determining from the one of the paging signalling and the random access procedure message a set of radio resources on which the user plane data is to be transmitted by the wireless communications network to the communications device, wherein the user plane data is to be received by the communications device from the wireless communications network as part of a random access procedure, receiving from the wireless communications network a second indication that the communications device should transmit an application layer response to the wireless communications network providing indication that the communications device successfully received the user plane data using the determined set of radio resources, and transmitting to the wireless communications network a third indication of whether or not the communications device successfully received the user plane data using the determined set of radio resources, wherein the second indication that the communications device should transmit the application layer response is received in one of:

the paging signalling,
a random access response message received from the wireless communications network, the random access response message being a second message of the random access procedure, and
a downlink message received from the wireless communications network using the determined set of radio resources while the communications device is not in the active radio resource connected mode, the user plane data being received as part of the downlink message.

2. The method according to claim 1, comprising:
receiving the user plane data from the wireless communications network using the determined set of radio resources while the communications device is not in the active radio resource connected mode,
wherein the transmitted third indication of whether or not the communications device successfully received the user plane data using the determined set of radio resources indicates that the communications device has successfully received the user plane data using the determined set of radio resources.

3. The method according to claim 1, comprising:
determining that the user plane data has not been successfully received from the wireless communications network using the determined set of radio resources while the communications device is not in the active radio resource connected mode,
wherein the transmitted third indication of whether or not the communications device successfully received the user plane data using the determined set of radio resources indicates that the communications device has not successfully received the user plane data using the determined set of radio resources.

4. The method according to claim 3, comprising:
receiving, subsequent to the communications device indicating that the communications device has not successfully received the user plane data using the determined set of radio resources, the user plane data from the wireless communications network using a different set of radio resources compared to the determined set of radio resources while the communications device is not in the active radio resource connected mode using a fourth message of the random access procedure.

5. The method according to claim 1, wherein the third indication is transmitted using a physical uplink control channel.

6. The method according to claim 1, wherein the third indication is transmitted using a third message of the random access procedure.

7. The method according to claim 6, wherein the transmission of the third message indicates that the communications device has not successfully received the user plane data using the determined set of radio resources.

8. The method according to claim 6, wherein the third message includes a first identifier associated with the communications device, the first identifier indicating that the communications device has successfully received the user plane data using the determined set of radio resources.

9. The method according to claim 6, wherein the third message includes a first identifier associated with the user plane data, the first identifier indicating that the communications device has successfully received the user plane data using the determined set of radio resources.

10. The method according to claim 6, comprising:
calculating a second identifier by carrying out a predetermined function on a first identifier associated with the communications device,
wherein the third message includes the second identifier, the second identifier indicating that the communications device has not successfully received the user plane data using the determined set of radio resources.

11. The method according to claim 6, comprising:
calculating a second identifier by carrying out a predetermined function on a first identifier associated with the user plane data,
wherein the third message includes the second identifier, the second identifier indicating that the communications device has not successfully received the user plane data using the determined set of radio resources.

12. The method according to claim 1, wherein the paging signalling comprises the third indication that the communications device should transmit the application layer response to the wireless communications network providing the indication that the communications device successfully received the user plane data using the determined set of radio resources.

13. The method according to claim 1, comprising:
receiving the random access response message from the wireless communications network, the random access response message including the second indication that the communications device should transmit the application layer response to the wireless communications network providing the indication that the communications device successfully received the user plane data using the determined set of radio resources.

14. The method according to claim 1, comprising:
receiving the user plane data from the wireless communications network as part of the downlink message using the determined set of radio resources while the communications device is not in the active radio resource connected mode,
wherein the downlink message comprises includes the second indication that the communications device should transmit the application layer response to the wireless communications network providing the indication that the communications device successfully received the user plane data using the determined set of radio resources.

15. The method according to claim 1, comprising:
receiving the user plane data from the wireless communications network using the determined set of radio resources while the communications device is not in the active radio resource connected mode,
determining that an application layer acknowledgement should be transmitted by the communications device to the wireless communications network as part of the application layer response, and
transmitting the application layer acknowledgement to the wireless communications network during a time period specified by the wireless communications network.

16. The method according to claim 1, wherein the third indication is transmitted using a preamble signal selected from a plurality of specified preamble signals.

17. The method according to claim 16, wherein the selected preamble signal is selected depending on whether the third indication is that the communications device has successfully received the user plane data using the determined set of radio resources or whether the third indication is that the communications device has not successfully received the user plane data using the determined set of radio resources.

18. The method according to claim 16, comprising:
transmitting the third indication in response to receiving, from the wireless communications network, a notification that the user plane data will be transmitted by the wireless communications network to the communications device, the notification being received as part of the random access response message.

19. A communications device for receiving user plane data from a wireless communications network when the communications device is not in an active radio resource connected mode, the communications device comprising transceiver circuitry and controller circuitry configured in combination:
- to receive one of paging signalling and a random access procedure message from the wireless communications network, wherein the one of the paging signalling and the random access procedure message includes a first indication that the wireless communications network has user plane data for transmission to the communications device while the communications device is not in the active radio resource connected mode,
- to determine from the one of the paging signalling and the random access procedure message a set of radio resources on which the user plane data is to be transmitted by the wireless communications network to the communications device, wherein the user plane data is to be received by the communications device from the wireless communications network as part of a random access procedure,
- to receive from the wireless communications network a second indication that the communications device should transmit an application layer response to the wireless communications network providing indication that the communications device successfully received the user plane data using the determined set of radio resources, and
- to transmit to the wireless communications network a third indication of whether or not the communications device successfully received the user plane data using the determined set of radio resources,
- wherein the second indication that the communications device should transmit the application layer response is received in one of:
- the paging signalling,
- a random access response message received from the wireless communications network, the random access response message being a second message of the random access procedure, and
- a downlink message received from the wireless communications network using the determined set of radio resources while the communications device is not in the active radio resource connected mode, the user plane data being received as part of the downlink message.

20. An infrastructure equipment forming part of a wireless communications network for transmitting user plane data to a communications device when the communications device is not in an active radio resource connected mode, the infrastructure equipment comprising transceiver circuitry and controller circuitry configured in combination:
- to transmit one of paging signalling and a random access procedure message to the communications device, wherein the one of the paging signalling and the random access procedure message includes a first indication that the wireless communications network has user plane data for transmission to the communications device while the communications device is not in the active radio resource connected mode and indication of a set of radio resources on which the user plane data is to be transmitted by the wireless communications network to the communications device, wherein the user plane data is to be received by the communications device from the wireless communications network as part of a random access procedure,
- to transmit the user plane data to the communications device using the determined set of radio resources while the communications device is not in the active radio resource connected mode,
- to transmit to the communications device a second indication that the communications device should transmit an application layer response to the infrastructure equipment providing indication that the communications device successfully received the user plane data using the set of radio resources, and
- to receive from the communications device a third indication of whether or not the communications device successfully received the user plane data using the determined set of radio resources,
- wherein the second indication that the communications device should transmit the application layer response is received in one of:
- the paging signalling,
- a random access response message received from the wireless communications network, the random access response message being a second message of the random access procedure, and
- a downlink message received from the wireless communications network using the determined set of radio resources while the communications device is not in the active radio resource connected mode, the user plane data being received as part of the downlink message.

* * * * *